UNITED STATES PATENT OFFICE.

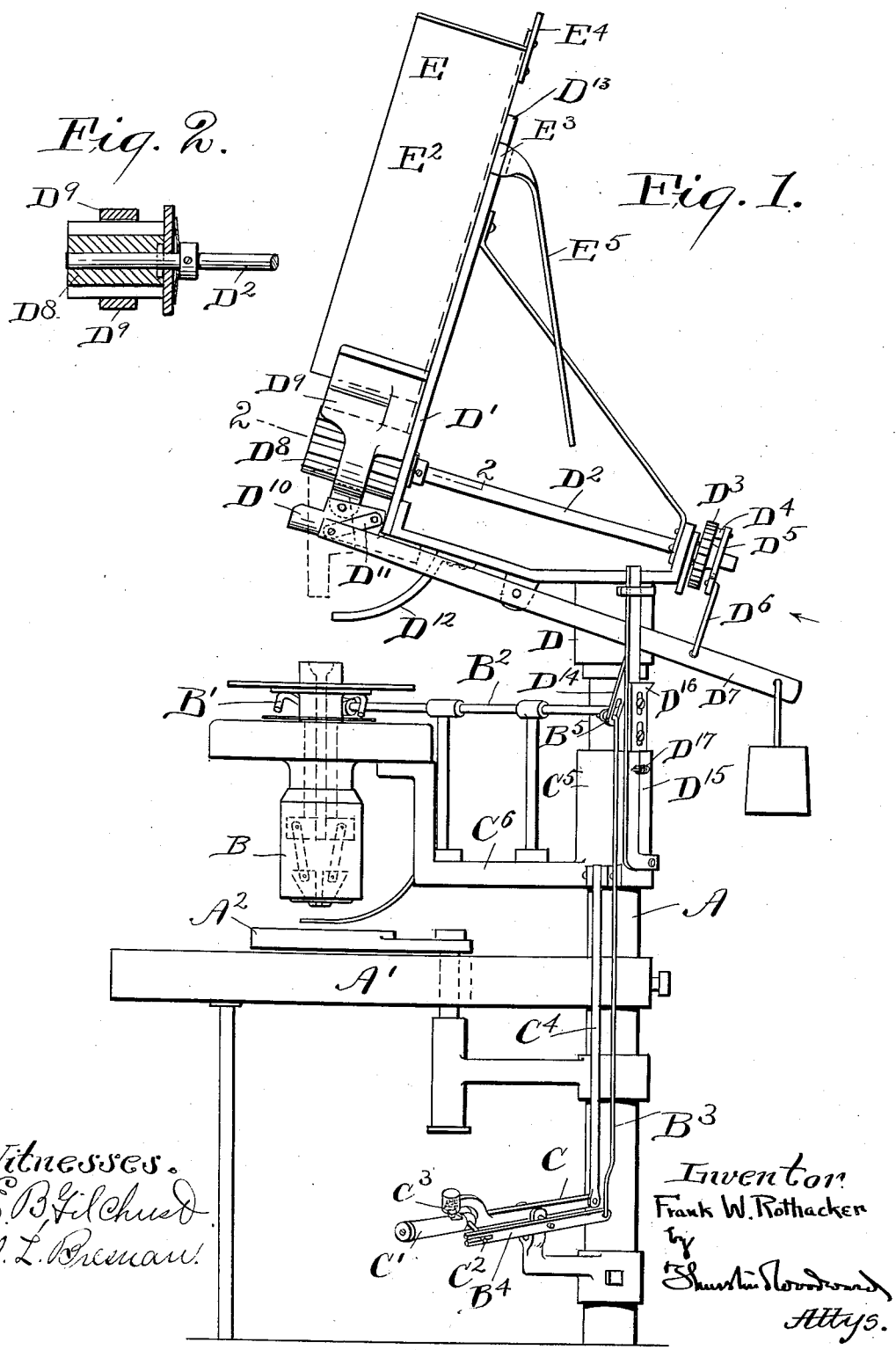

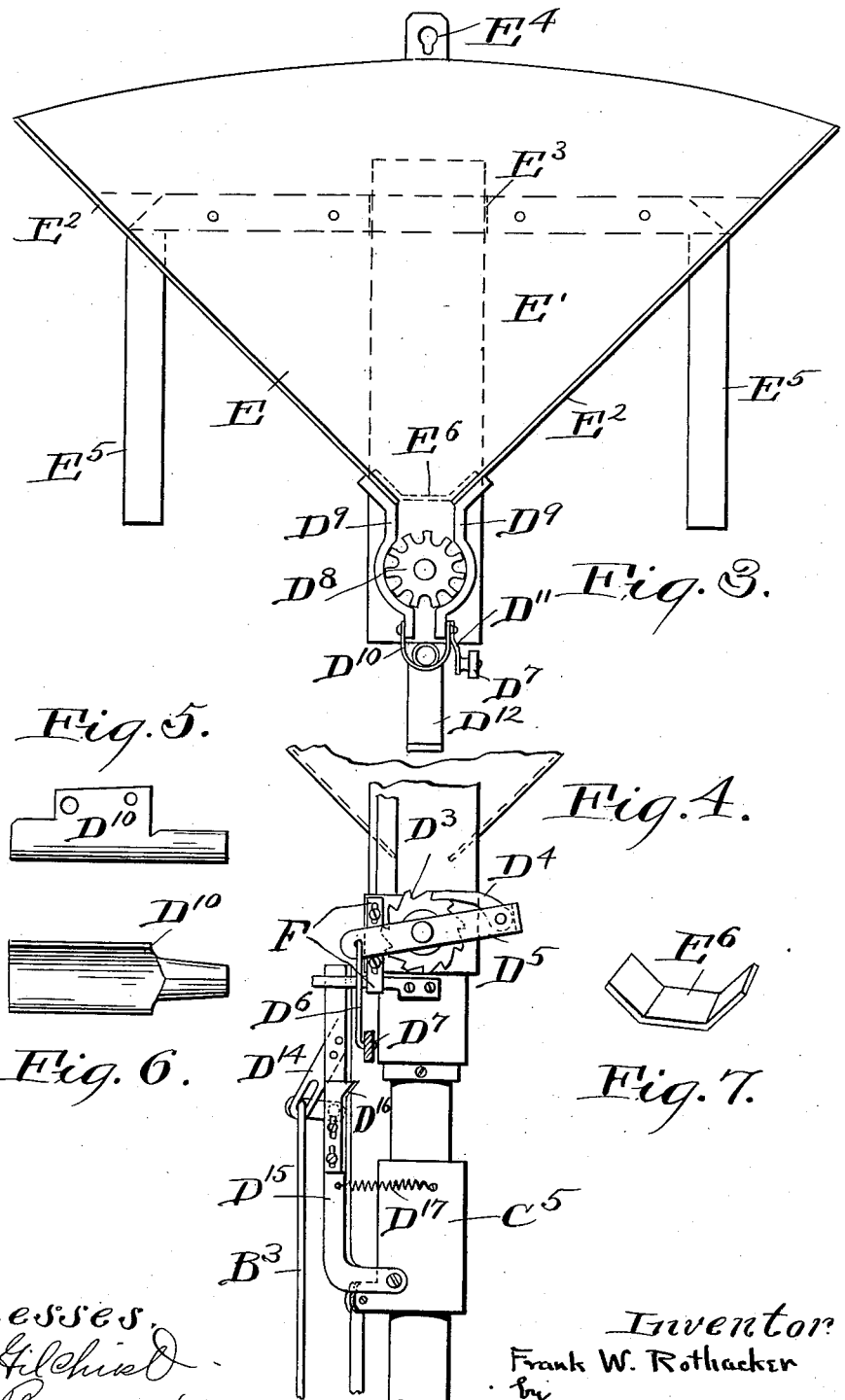

FRANK W. ROTHACKER, OF FOSTORIA, OHIO, ASSIGNOR, BY MESNE ASSIGNMENTS, TO GENERAL ELECTRIC COMPANY, A CORPORATION OF NEW YORK.

GLASS-MANIPULATING MECHANISM.

1,119,642.     Specification of Letters Patent.     Patented Dec. 1, 1914.

Application filed July 23, 1908. Serial No. 444,947.

*To all whom it may concern:*

Be it known that I, FRANK W. ROTH-ACKER, a citizen of the United States, residing at Fostoria, in the county of Seneca and State of Ohio, have invented a certain new and useful Improvement in Glass-Manipulating Mechanism, of which the following is a full, clear, and exact description.

The object of the present invention is to provide improvement in mechanism for manipulating glass tubes.

More particularly my object is to provide mechanism for feeding tubes at intervals in an orderly manner to a chuck or similar holding device.

I have especially adapted my invention to a machine used for tubulating incandescent lamp bulbs and an embodiment of the invention in such an apparatus is described in the following specification with reference to the accompanying drawings in which;

Figure 1 is an elevation of a tubulating apparatus with my invention embodied therein. Fig. 2 is a detail transverse section on the line 2—2 of Fig. 1. Fig. 3 is a front elevation showing the hopper and mechanism for feeding the tubes therefrom. Fig. 4 is a detail rear elevation of the connections for operating the feeding devices at the bottom of the hopper. Fig. 5 is a side elevation of the tilting chute used in connection with the feeding device. Fig. 6 is a plan view of said chute. Fig. 7 is a perspective view of the false bottom or removable gate for the hopper.

In the various views I have shown the mechanism supported by a standard A such as is ordinarily employed for use with tubulating machines. I also show an ordinary table A' for supporting the usual burners (not shown), employed for directing a fusing flame upon the tubes as they are about to be applied to the tip ends of the lamp bulbs. A suitable rest $A^2$ for the upper end of the lamp bulb is supported on the standard A.

The glass tubes as they are being heated are held in a rotatable chuck B which in the present apparatus is air driven, after the manner shown in the patent to Fagan, 882,190, issued March 17th, 1908. This chuck is controlled as to its opening and closing by means of a yoke B' mounted at one end of a rock shaft $B^2$ after the manner shown in the Fagan patent referred to; said rock shaft receiving oscillation through the medium of a connecting rod $B^3$ and a rocking lever $B^4$ operated by a hand lever C pivotally mounted on a bracket at the lower end of the supporting standard.

It is to be noted that when the yoke is thrown upward by the connections to be subsequently described, the chuck will be lifted up so that its jaws open. When the yoke is dropped to its intermediate position as shown in Fig. 1, the chuck drops so that its jaws are thrown together by the cone in which they fit at their lower end. If the yoke be depressed still farther the bent ends thereof bear upon a plate rigid with the rotatable chuck and thus may serve to brake the same when it is desired to stop rotation. The hand piece C' on this hand lever is rotatable on said lever, and has projecting from it a pin $C^2$ working in a slot in the end of the rocking lever $B^4$ just described. Obviously the rotation of this hand piece will effect the oscillation of the rocking lever, and, through this, oscillate the yoke B' which controls the opening, closing and rotation of the chuck.

A spring pressed detent $C^3$ supported from the hand lever drops into a notch upon the hand piece and serves to ordinarily retain the latter in the intermediate position at which the yoke is thrown neither up to open the chuck nor downward to serve as a brake against the rotation thereof. In this position of the hand piece the chuck will be closed and any tubes held therein will be rapidly rotated. At the end of the hand lever is a link $C^4$ supporting a sliding vertically reciprocatable sleeve $C^5$ which has a bracket $C^6$ projecting therefrom carrying the chuck mechanism.

Obviously by means of this hand lever the chuck may be opened and closed independently of its vertical reciprocation, and further, the chuck may be vertically reciprocated independently of its being opened or closed. This is a highly important condition in the operation of the tubulating mechanism.

Mounted at the upper end of the supporting shaft is the device which I employ for feeding tubes to the rotatable reciprocating chuck, and this mechanism is supported by a sleeve D with a supporting frame D' secured thereto. In the supporting frame is journaled a rotatable shaft $D^2$ having at the rear end thereof a ratchet wheel $D^3$ which is engaged by a pawl $D^4$ pivoted on one end of an oscillatory arm $D^5$ loosely mounted on the end of said shaft. Said arm is connected by means of a link $D^6$ with a pivotally mounted weighted lever $D^7$ through the medium of which mechanism the aforesaid shaft is rotated after a manner to be subsequently described.

On the front end of the shaft is mounted a feeding cylinder $D^8$ provided with grooves on its periphery, adapted to receive the tubes as they are fed from the hopper E above. Secured adjacent to the feeding cylinder and on each side thereof are a pair of castings $D^9$ which serve to support the hopper and to guide the tubes from the hopper to the cylinder, and also to retain the tubes in the cylinder grooves during the feeding movement. At the lower end of these castings is pivotally supported a tilting, trough-like feed chute $D^{10}$; said chute having link connection $D^{11}$ with the before mentioned weighted lever so that the oscillation of the lever will cause the chute to swing from a horizontal to a vertical position or vice versa.

Secured to the lower end of the supporting frame is a curved retaining plate $D^{12}$ adapted to prevent a tube from sliding out of the trough-like chute as it moves from a horizontal to a vertical position, said plate terminating at the proper point to permit the tube to pass from the chute only when the latter is at the desired position as, for example, the position in which the tube will drop directly into the rotatable clutch.

The hopper E is, as shown in Fig. 3, constructed with a back $E'$ and two sloping converging sides $E^2$. For reasons hereafter referred to, I prefer to make this hopper removable, and, for this purpose, so constructed as to rest upon the castings $D^9$ at the bottom, and provide it at the back with a loop or strap $E^3$ adapted to fit over a projecting upright member $D^{18}$ of the frame. By this means the hopper may be lifted upward and removed from the apparatus when it is empty, and a new hopper full of tubes may replace it. The hopper is preferably provided at its rear end with some suitable means $E^4$ for hanging it upon a nail or hook, and is also provided at its rear end with projecting legs or supports $E^5$ by means of which the hopper may stand upon a table during the proceeding of loading the same.

In order to fill such a hopper I find it preferable to use a false gate $E^6$ at the bottom, such as shown in Fig. 7, to close the opening in the hopper while the operator is placing and preparing the tubes therein. When the hopper is in position, this gate is drawn out from under the tubes and thereafter the tubes are free to feed from the hopper in accordance with the operation of the machine.

In practice the operator will ordinarily stand the hopper with its false gate in position closing the opening at the bottom and place therein the tubes in a horizontal position with one end at the front of the hopper. When the hopper is thus filled, it is hung in a suitable position and a glazing flame passed over the exposed ends of the tubes, thus fitting them particularly for serving their function as exhaust tubes for the bulbs. The reason for this glazing process is that it rounds the edges of the tube end and thus prevents the cutting of the rubber exhaust head which is placed thereover during the exhausting of the bulb. After the glazing process referred to, the hopper is placed on any machine which may be ready for a full hopper. Such attachment is had and the hopper securely held in position by resting it upon the castings about the feed cylinder and passing the strap at the back over the upright projecting portion of the supporting frame. The gate at the bottom is then drawn outward permitting the tubes to fall downward upon the feed cylinder in a position to fill the grooves on the periphery of the latter. Assuming the cylinder to have been rotated to a point at which the next movement thereof will bring a groove containing a tube into alinement with the vertical opening between the castings through which the tube is dropped into the feed chute, the operator will then secure such rotation as desired by the manipulation of the single handle which controls the entire machine. It is of course desirable that the chuck jaw should be open at the time the tube is fed thereto so that the tube may fall on to a spacer below.

For the purpose of opening the chuck jaws the hand piece $C'$ is given a rotative movement, and the rod $B^3$ will be pushed up, thus oscillating the yoke on the crank shaft to open the chuck. The upper end of said rod is bent laterally at $B^5$ and the bent portion projects through a slot in an arm $B^{14}$ rigidly fixed to a pivoted bar $D^{15}$ carrying an adjustable dog $D^{16}$ adapted to take under the end of the weighted lever $D^7$. The pivoted bar is secured at its lower end and supported by the vertically reciprocatable sleeve $C^5$ which supports the chuck, and consequently is moved up or down in accordance with the vertical movements of said chuck. A spring $D^{17}$ attached to said sleeve tends to draw the bar over to such a position that the dog will engage the weighted lever when the sleeve is raised to a proper elevation. The inward movement of said dog is obviously controlled by the laterally bent end $B^5$ of the connecting rod $B^3$ which operates the rock shaft $B^2$, and as said connecting rod rises to rotate the said rock shaft, the bent end of the said rod will rise in the slot in arm $D^{14}$ and permit the spring $D^{17}$ to draw over the pivoted bar $D^{15}$ until the dog $D^{16}$ lies under the weighted lever $D^7$. Thus the operator upon giving the hand piece a turn by which the chuck jaws are opened, will by this same movement permit the dog on the pivoted bar to pass under the weighted lever. A vertical movement of the hand lever C will then transmit a vertical movement to the sleeve supporting the chuck mechanism, and this movement will cause the dog to lift the weighted lever $D^7$. The rocking of the weighted lever will, through the link at the rear end thereof, oscillate the arm on which the pivoted dog is secured, thus throwing the said dog back a notch so that the next downward movement of the weighted lever will, through the medium of said pawl, cause the movement of the feed cylinder to the proper amount. The lifting of the weighted lever will also through its link connections at the forward end, cause the tilting of the feed chute, thus permitting any tube which may be resting therein to be moved to a vertical position, the tube as beforesaid being held within the chute, while said vertical movement takes place, by the arc-shaped retaining plate secured to the bottom of the supporting frame.

In order to prevent the chute from being thrown beyond the proper point for registration with the chuck, I provide an adjustable stop F, as shown in Fig. 4, at the rear end of the machine for limiting the upward throw of the weighted lever.

As soon as the tube is fed into the chuck it drops upon the spacing plate beneath, and the chuck may be closed by giving the hand piece a twist to the left, thus dropping the chuck dogs into place. This same movement of the hand piece which closes the chuck dogs will draw the dog on the pivoted bar back from underneath the weighted lever permitting the weight thereon to restore it to its normal position, and at the same time rotate the feed cylinder one notch.

The spacing plate beneath the chuck may be of any preferred form, such for example, as that shown in Fig. 3 of the patent to Fagan above cited. This spacing plate and the feed chuck together with the means for rotating the same are no part of my present invention and I do not desire to be considered as claiming the same.

By the expression "tube" as used in the specification and claims, I do not mean to limit myself to the mere hollow rods commonly called tubes, but I have used this expression as a generic term designed to cover the solid rods as well as the hollow tubes for want of a better generic expression, the particular structure of the rod or tube fed obviously not being material.

Having thus described my invention, I claim:

1. Mechanism for manipulating tubes comprising a chuck, means controlling the opening of said chuck, a hopper holding tubes with their length lying in a substantially horizontal direction, a means for feeding tubes from the hopper and turning them one by one into a vertical position and delivering them endwise in the said chuck, said feeding means being controlled in its operation by the means for opening the chuck.

2. Mechanism for handling tubes comprising a hopper having an outlet fed by gravity, a feeding device at said outlet for feeding single tubes, an open-ended trough chute in position to receive the tube from the feeding device, means for tilting said chute intermittently, and a stationary member disposed so as to contact with the end of said tube to prevent it from sliding out of said chute during the tilting movement.

3. Mechanism for feeding tubes comprising a hopper with an outlet fed by gravity, a rotatable feeding device in position to receive the tubes from said outlet and deliver them singly in a substantially horizontal position, a tilting chute below said feeding device arranged to carry the tube to a substantially vertical position, means for intermittently tilting said chute, and a stationary plate disposed so as to contact with the end of said tube and retain it in said chute during the tilting movement.

4. Mechanism for manipulating tubes comprising a containing means for a number of tubes, a chuck for receiving and holding a single tube, a feeding means for delivering a single tube from said containing means to said chuck comprising an open-ended trough disposed below said containing means and arranged to receive a tube therefrom in a substantially horizontal position, means for tilting said trough into a substantially vertical position in line with said chuck, and a stationary retaining means coacting with the open end of said trough to prevent the tube from dropping during said tilting movement.

5. In a machine of the class described, the combination of a chuck, hand-controlled means for opening and closing said chuck, a hopper disposed above said chuck for holding a number of tubes, a tiltable trough for delivering a tube to said chuck, rotatable means disposed at the outlet of said hopper for delivering a tube to said trough, and means whereby the operation of the chuck opening means controls the operation of said trough and said rotatable delivery means.

6. In a machine of the class described, the combination of a chuck, hand-controlled means for delivering a single tube from said hopper to said chuck comprising a rotatable closure for the bottom of said hopper and means for rotating said closure step by step, and connections whereby each operation of said chuck opening means causes the said closure to be rotated a single step.

7. A machine of the class described comprising a chuck, means for opening and closing said chuck, a hopper adapted to hold a number of tubes disposed above said chuck, means for feeding a single tube from said hopper to said chuck comprising a rotatable closure disposed at the outlet of said hopper, means for rotating said closure step by step, a chute mounted below said closure and means for tilting the same into a position substantially in line with said chuck, and connections whereby the operations of said chuck opening and closing means controls the operation of the other parts of the machine.

In testimony whereof, I hereunto affix my signature in the presence of two witnesses.

FRANK W. ROTHACKER.

Witnesses:
W. B. McCLARAN,
FRED. C. MILLER.